(12) United States Patent
Freudelsperger

(10) Patent No.: US 7,770,720 B2
(45) Date of Patent: Aug. 10, 2010

(54) CONVEYING DEVICE FOR CONVEYING GOODS ON PALLETS ALONG A HORIZONTAL CONVEYING LINE

(75) Inventor: Karl Freudelsperger, Hart bei Graz (AT)

(73) Assignee: Knapp Logistik Automation GmbH, Hart bei Graz (AT)

( * ) Notice: Subject to any disclaimer, the term of this patent is extended or adjusted under 35 U.S.C. 154(b) by 296 days.

(21) Appl. No.: 11/569,629

(22) PCT Filed: Jun. 29, 2005

(86) PCT No.: PCT/EP2005/006976

§ 371 (c)(1),
(2), (4) Date: Nov. 27, 2006

(87) PCT Pub. No.: WO2006/002879

PCT Pub. Date: Jan. 12, 2006

(65) Prior Publication Data

US 2008/0006510 A1    Jan. 10, 2008

(30) Foreign Application Priority Data

Jul. 1, 2004    (DE) .................. 10 2004 032 066

(51) Int. Cl.
*B65G 21/00*    (2006.01)
(52) U.S. Cl. .................. 198/861.5; 198/583; 198/592; 198/860.4
(58) Field of Classification Search ............... 198/861.5, 198/861.3, 581, 592, 589, 584
See application file for complete search history.

(56) References Cited

U.S. PATENT DOCUMENTS

| | | | | |
|---|---|---|---|---|
| 1,952,392 A | * | 3/1934 | Taylor | 198/836.3 |
| 3,746,144 A | | 7/1973 | Englert | |
| 3,892,137 A | * | 7/1975 | Menzel | 74/99 R |
| 4,561,535 A | | 12/1985 | Taniguchi | |
| 4,753,337 A | * | 6/1988 | Grosjean | 198/583 |
| 4,949,837 A | * | 8/1990 | Huber | 198/782 |
| 5,123,517 A | * | 6/1992 | Windau | 198/463.3 |
| 5,172,804 A | * | 12/1992 | Chersin | 198/861.5 |
| 5,568,857 A | | 10/1996 | Chen et al. | |
| 6,374,537 B1 | * | 4/2002 | Van Wingerden et al. | 47/17 |
| 6,409,011 B1 | | 6/2002 | Ferguson | |
| 6,488,145 B1 | * | 12/2002 | Diego et al. | 198/861.5 |

\* cited by examiner

*Primary Examiner*—Gene Crawford
*Assistant Examiner*—Kavel P Singh
(74) *Attorney, Agent, or Firm*—McGlew and Tuttle, P.C.

(57) ABSTRACT

A conveying device (1) is provided for conveying preferably heavy goods on pallets or the like on an essentially horizontal conveying line or track (5, 6) on the floor (4) of a room or outdoors. The conveying line is, in the longitudinal direction, divided into a first conveying track (5) and into a second conveying track (6). A dividing area is formed by at least one moving partial piece of the same kind that can be folded upward in the form of a folding piece (3) similar to a drawbridge in order to provide an unobstructed transversal passage (D), for example, for a fork-lift truck.

4 Claims, 5 Drawing Sheets

CONVEYING DEVICE FOR CONVEYING GOODS ON PALLETS ALONG A HORIZONTAL CONVEYING LINE

CROSS REFERENCE TO RELATED APPLICATIONS

This application is a United States National Phase application of International Application PCT/EP2005/006976 and claims the benefit of priority under 35 U.S.C. §119 of German Patent Application 10 2004 032 066.7 filed Jul. 1, 2004, the entire contents of which are incorporated herein by reference.

FIELD OF THE INVENTION

The present invention pertains to a conveying device for conveying preferably heavy materials on pallets or the like along an essentially horizontal conveying track.

BACKGROUND OF THE INVENTION

The present invention pertains to a conveying device for conveying preferably heavy materials to be conveyed on pallets or the like along an essentially horizontal conveying track on the floor of a room or in the open air.

The term "pallet" as used above and hereinafter shall not be defined in the limited sense of the word; rather, the present invention also comprises systems in which other conveying units, for example, skeleton containers, are used to convey materials to be conveyed, especially individually packaged products, in or on them. If the material to be conveyed is a larger individually packaged product with a comparatively larger base, "pallets" or the like can be eliminated altogether.

Pallet conveying tracks of this type are, contrary to normal belt type conveyors or roller conveyors, which are designed for small, light-weight materials to be conveyed, are comparatively heavy and clumsy, have large dimensions and have a very stable design in order to make it possible to reliably pick up and convey heavy loads within a conveying system, for example, in a commissioning unit, on pallets, as the name already implies. Pallets including the material to be conveyed that is located on it may form a parallelepiped of a size that has a base with a length of 1.2 m×a width of 0.8 m and has a height of 1.4 m. Another embodiment even provides for a double width of 1.2 m at equal length and height. A pallet plus the load may weigh up to 1,250 kg. The pallet conveying system must have a correspondingly stable design. It is obvious that pallet conveying systems are installed, for static reasons, mainly on the floor of a warehouse or in open air rather than in a high position in a warehouse, and long paths must many times be traveled from the site at which the material to be conveyed is introduced into the storage facility to the site at which it is removed from the storage facility. Because of the installation of the pallet conveying track near the floor, the storage room can be utilized for other logistic considerations, for example, motions of material being conveyed, machines and/or persons, in a storage facility or in the open air only in parallel to the conveying track.

SUMMARY OF THE INVENTION

The object of the present invention is to create a conveying track (line) of the type mentioned in the introduction, which offers additional logistic possibilities for using the storage unit in a warehouse or in the open air with simple means and can also convey heavy materials to be conveyed weighing up to 1,250 kg at the same time.

The essence of the present invention is that the conveying track is divided into a first conveying track and a second conveying rack in the longitudinal direction along a first path and the division area is formed by at least one hinged piece of the same type, which can be folded upward from the plane of the conveying track. The conveying track, installed on the floor of a room or in open air in the first path, is a double belt conveyor with two lateral rotary drives, which extend in the longitudinal direction of the conveying track and on which the pallets are supported on the top side. The essential feature of the present invention is especially that the hinged piece is designed as a drawbridge with two lateral flexible pulling means that can be wound up and can be pivoted upward from a floor position into a high position by winding up the pulling means and locked by locking means. As a result, a section of the pallet type materials handling technology can be "temporarily removed," if necessary, with simple means, rapidly and preferably mechanically or fully automatically, in order to expose the subjacent floor surface completely in such a way that, for example, a high fork lift with another material to be conveyed, which is loaded on it, can cross the conveying track along a seasonal path at the same level without being hindered. The passage of the fork lift in the transverse direction of the conveying track or second path is no longer hindered by any cable duct, longitudinal member, etc. It is obvious that substantially more complex and improved if not even optimized conveying and routing systems can be embodied as a result in a warehouse with simple measures compared to what is possible in this respect in the state of the art of the conventional pallet type materials handling technology. A section of the pallet type materials handling technology is consequently folded upward. A passage or second path, which may have a width between 1 m and 3 m depending on the design, becomes free as a result. The section or hinged piece is preferably also driven by the adjoining materials handling technology. The pivoting motion is driven by one or more drives (electric or hydraulic motor) preferably with a stop brake. Especially flat belts with recessed steel pulling cables are used as pulling means for pulling up the hinged piece. Two hinged pieces, which adjoin each other, may optionally be pulled up simultaneously from two sides in order to release a middle opening for the second path with a broad passage. However, it is also possible to articulate two hinged pieces adjoining each other to one another themselves in order to pull up the two hinged pieces simultaneously from one side and to fold them onto one another. A broader passage, which corresponds to nearly twice the length of the two hinged pieces, is created in this variant as well.

Even though a mobile section is integrated, a pallet type conveying track can be operated without a reduction in the conveying output and/or the maximum pallet weight/material to be conveyed of up to 1,250 kg. Pallets including material to be conveyed, which is loaded thereon, can be used without problems according to the present invention in a size with a base of 1.2 m in length×0.8 m in width and a height of 1.4 m in one preferred series and even with a double width of 1.2 m with equal length and height in another preferred series. Crosswise traffic along the second path, optionally completely independently from the longitudinal traffic along the first path and the purpose of the pallet type conveying track, can be carried out at the same level (rather than in a jolting manner at a higher level via the lateral longitudinal rails, optionally with oblique floor ramps on the entry side and the outlet side and level-equalizing middle pieces, etc., between the longitudinal rails). The present invention resembles laid railroad rails in which a track crossing, in which the railroad rails are folded up in the area of the track crossing for the crossing of the motor vehicle traffic in order to make possible a crossing traffic without jolting (which is, of course, undesirable for static reasons). Contrary to the experts, it was also found in case of pallet type conveyors that the folding up of even heavy hinged pieces according to the present invention is nevertheless advantageous.

The hinged pieces according to the present invention are advantageous only because they are operated in conjunction with flexible pulling means that can be wound up, rather than with push rods or the like. The slender, light-weight pulling means are able to lift up the heavy hinged piece, which is manufactured according to the double-belt materials handling technology, like the rest of the conveying track as well, rather than according to the roller conveyor technology or the belt conveyor technology, because these technologies are not suitable for heavy loads.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
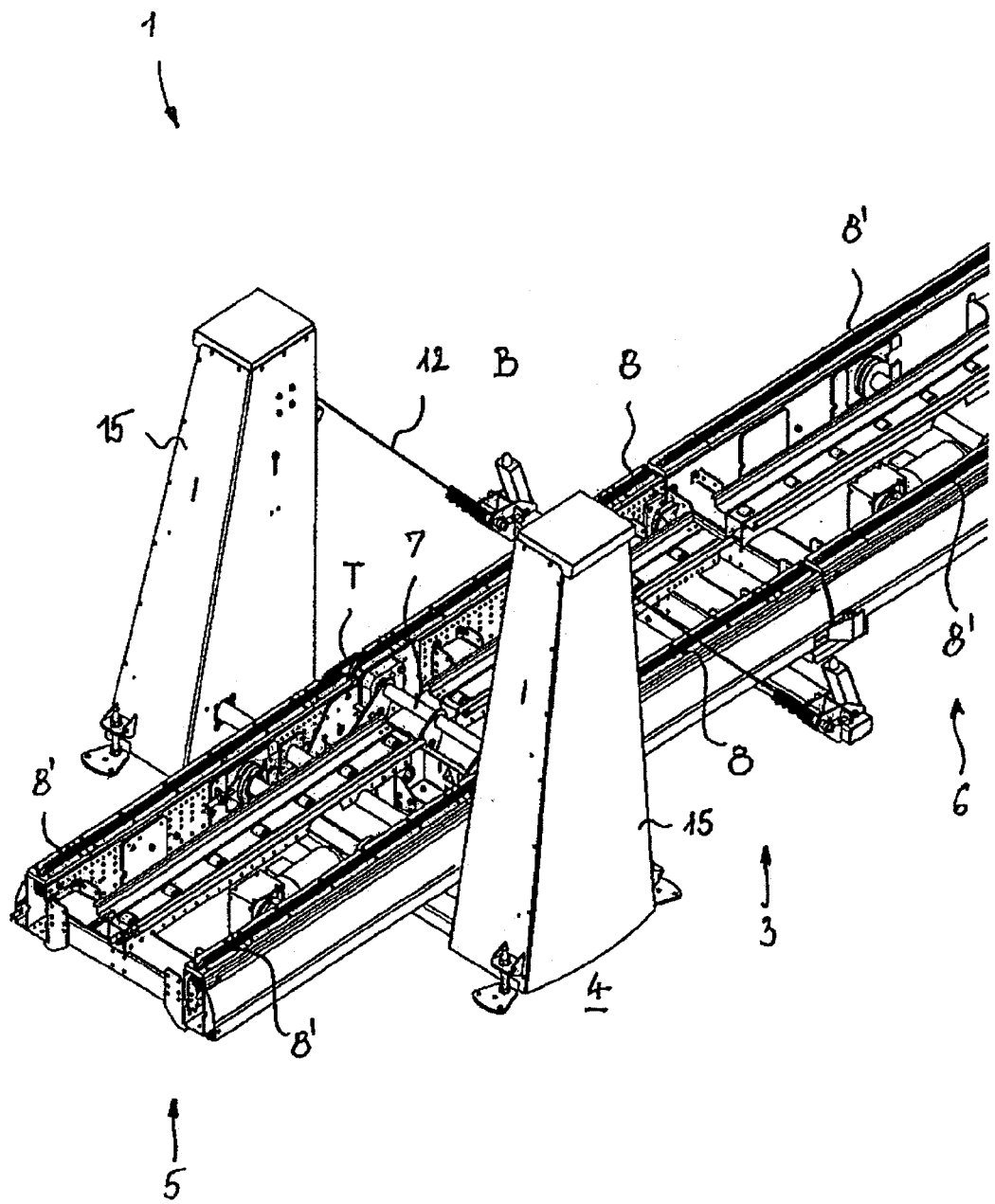
FIG. 1 is a schematic perspective view of a pallet type conveying track according to the present invention with a hinged piece in a floor position.

Referring to the drawings in particular, a conveying device 1 comprises a straight, horizontal conveying track for conveying heavy materials to be conveyed on pallets (not shown) along the conveying track on the floor 4 of a room or in open air in a first path.

The conveying track has two lateral rotary drives 8' in the longitudinal direction, which form a support plane for the pallets on the top side, which support plane is flat, even though it is provided with holes.

In particular, the conveying track is divided into a first conveying track 5 and a second conveying track 6 in the longitudinal direction of the first path. The division area is formed, according to FIGS. 1 through 3, by a hinged piece 3 of the same type, which is articulated to the first conveying track 5 with a horizontally, transversely extending pivot axis 7, and can be pivoted upward from a floor position B according to FIG. 1 into a high position H according to FIG. 3 and can be locked. The high position corresponds to an oblique hinged piece 3, which can nearly assume the vertical position. The hinged piece 3 is designed in the form of a drawbridge and has two lateral, flexible pulling means 12, which can be wound up, as will be described below.

Like the first conveying track 5 and the second conveying track 6 as well, the hinged piece 3 has two lateral rotary drives 8, preferably chain or toothed belt drives. Like the first and second conveying tracks 5, 6 as well, the hinged piece 3 also has a middle support 9 in the longitudinal direction in the form of free-running rollers arranged at spaced locations from one another.

The two lateral rotary drives 8 are also driven by the adjoining first conveying track 5, to which the hinged piece 3 is articulated with a horizontal pivot axis 7.

In particular, the driven deflection axis of the lateral rotary drive 8' of the first conveying track 5 is at the same time the jointly driven deflection axis of the lateral rotary drives 8 of the hinged piece 3, which said deflection axis is connected in such a way that they rotate in unison, the common deflection axis also representing the horizontal pivot axis 7 about which the hinged piece can be pivoted up.

The deflection axis of the lateral rotary drives 8 of the hinged piece 3 and the deflection axis of the lateral rotary drive 8' of the first conveying track 5 may optionally also be arranged at slightly spaced locations from one another and connected to one another in a driving manner by a transmission T, preferably in the form of a circulating toothed belt.

The free, non-articulated longitudinal end of the hinged piece 3 as well as the longitudinal end of the second conveying track 6, which faces it and to which the hinged piece is not articulated, have centering and/or fixing means 11 for exactly aligning and securing the hinged piece 3 in the floor position B, in which it is not pivoted up.

Figure 2:
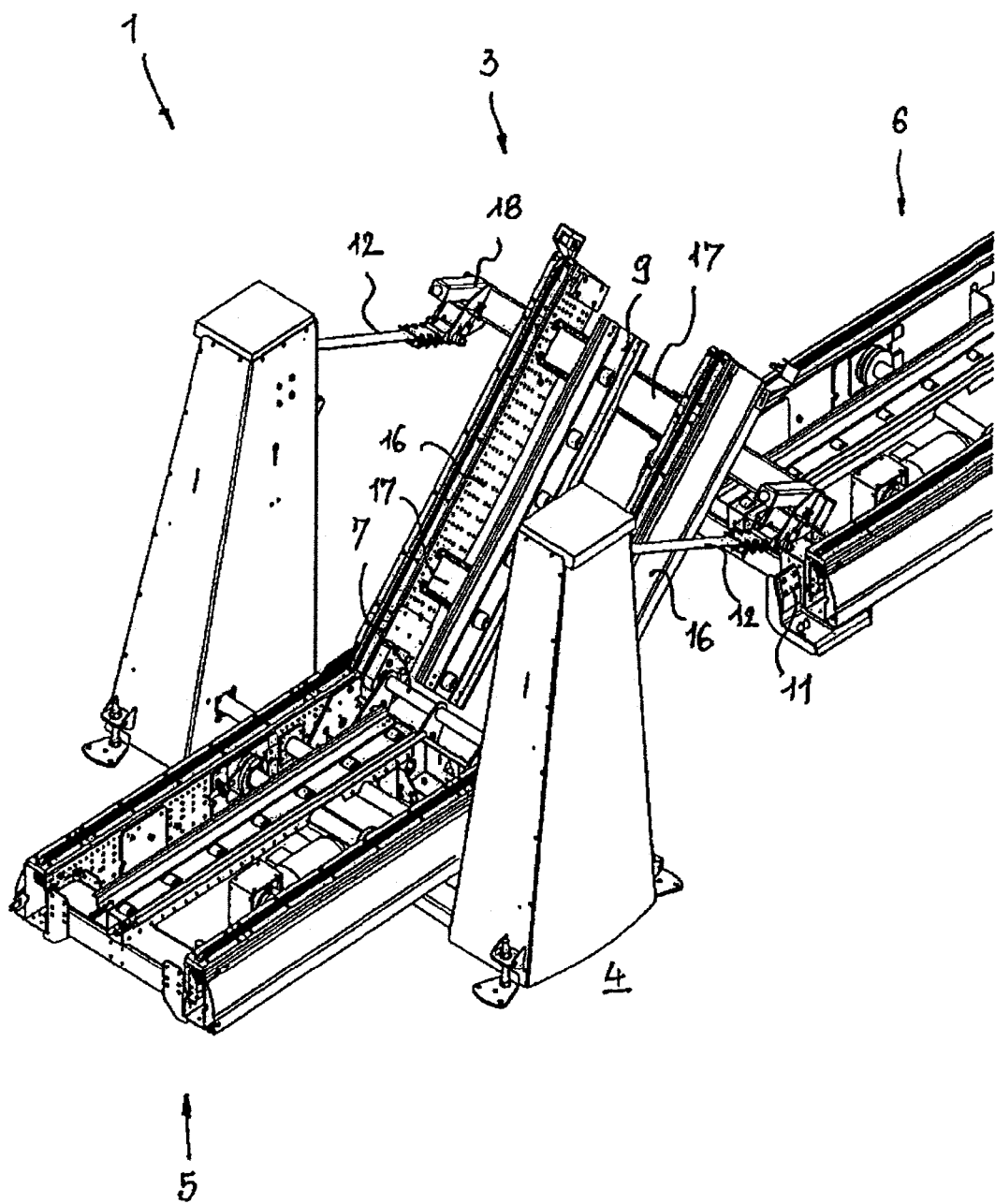
FIG. 2 is a schematic perspective view of a pallet type conveying track according to the present invention with a hinged piece in a middle position.
Figure 3:
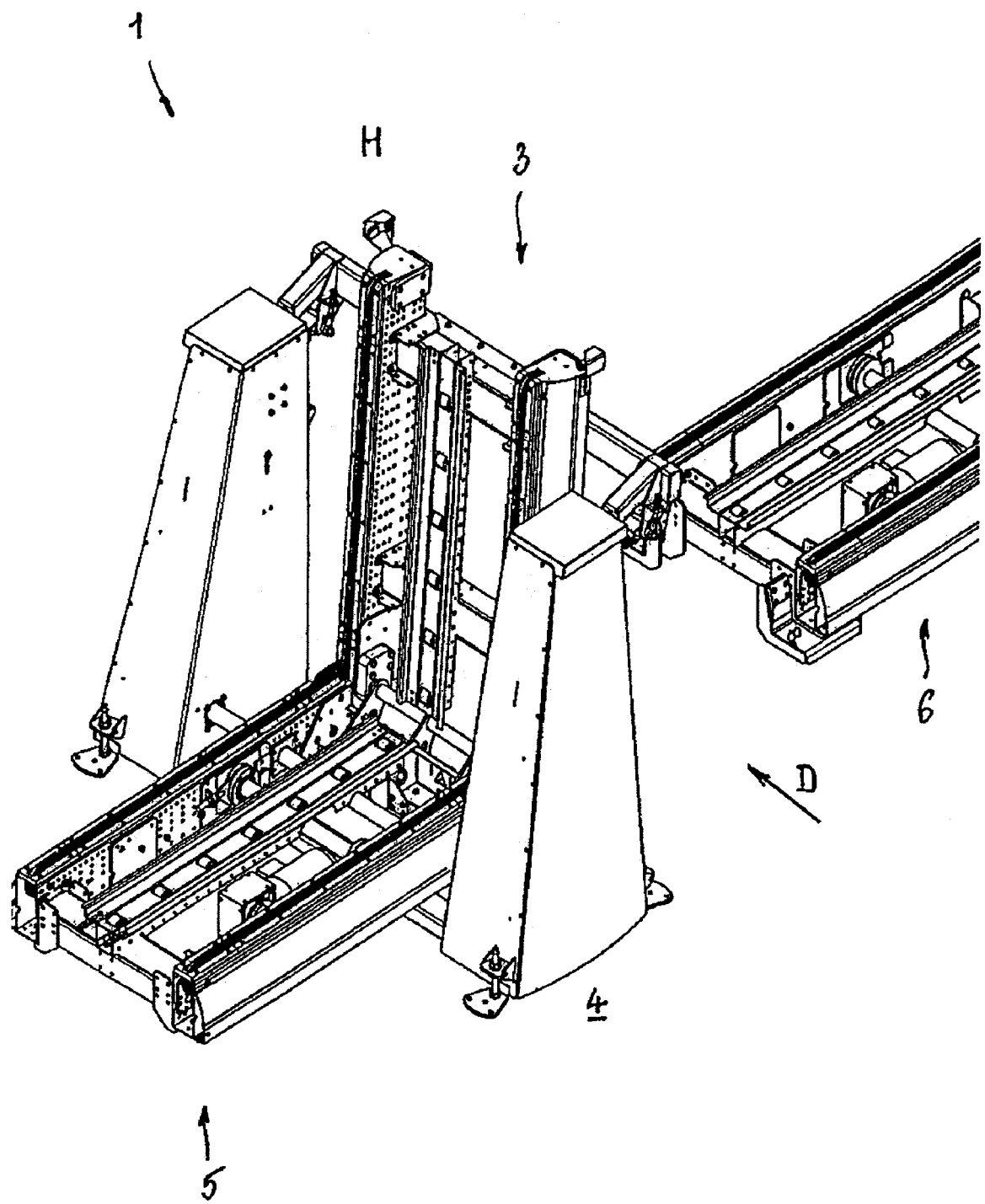
FIG. 3 is a schematic perspective view of a pallet type conveying track according to the present invention with a hinged piece in a high position for the purpose of creating a cross passage.

According to FIGS. 1 through 3, two lateral, synchronously controlled drives (not shown) with a stop brake are provided in pylons 15 for pivoting up the hinged piece 3. The drives or pylons 15 are supported on the floor side in the room/in open air, but they may also be fastened suspended on the ceiling side in the room or on an adjacent frame/shelf essentially above the hinged piece 3.

The drives for pivoting up the hinged piece 3 into the high position H and for fixing the hinged piece 3 in the high position are electric drives in the exemplary embodiment according to FIGS. 1 through 3. The drives are located at or in the aforementioned lateral pylons 15, which are supported in a height-adjustable manner outside the pallet passage of the conveying track in the area of the end of the first conveying track 5 on the floor 4 and extend vertically upwardly by the length of about one pallet in the form of conically tapered towers. The electric drives have a winch each, not shown, for winding up a flexible pulling means 12 in the form of a flat belt with embedded steel pulling cables, the free end of the flexible pulling means being attached to the hinged piece 3.

Consequently, the electric drives are located at or in the lateral pylons 15 in the area of the horizontal pivot axis 7 outside the pallet passage area with stable, flush support on the floor and/or fastening to the floor.

The lateral rotary drives 8 are arranged at or in lateral longitudinal beams 16 of the hinged piece 3, which are of the same design and are rigidly connected to one another with cross beams 17. One crossbeam 17, located preferably between the longitudinal center of the hinged piece 3 and the free, non-articulated longitudinal end of the hinged piece, has anchoring points 18 for fastening the free end of the flexible pulling means 12.

In the area of the hinged piece 3, the first and second conveying tracks 5, 6 have a pallet passage stop means (not shown), which is activated during pivoting up and when the hinged piece 3 is pivoted up.

Furthermore, an actuating switch (not shown), preferably a timer, is provided for pivoting the hinged piece 3 and optionally for stopping the conveying of the Conveying device 1 and/or for activating a pallet passage stop means in the area of the hinged piece 3. The actuating switch can be actuated via a wireless remote control, for example, by a driver of a fork lift when he wishes to cross the conveying track and free the second path passage D by pivoting up the hinged piece 3.

An optical personal safety means (not shown) is also provided in the area of the hinged piece 3 in the form of a motion sensor, which makes possible the emergency shut-off of a pivoting drive of the hinged piece 3 if a person comes into a hazardous area in the vicinity of the hinged piece 3.

Figure 4:
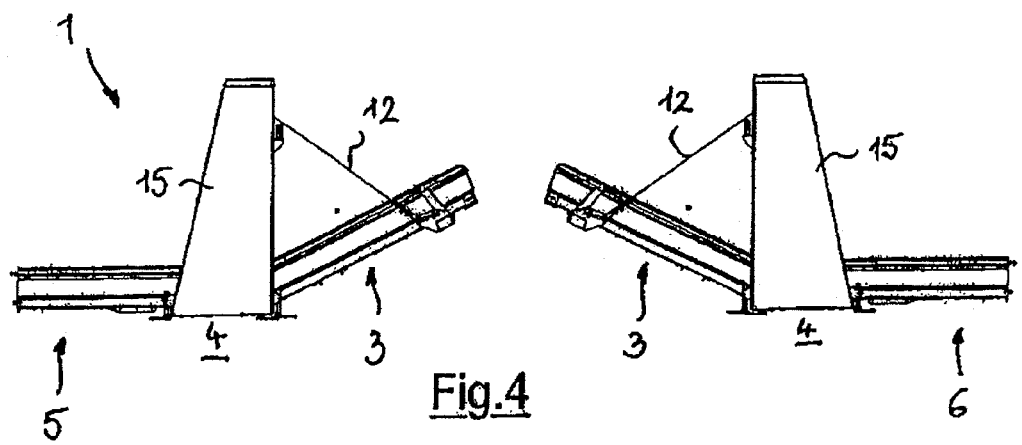
FIG. 4 is a side view showing another embodiment of pallet conveying tracks.

FIG. 4 shows another Conveying device 1 for conveying heavy materials to be conveyed on pallets in the form of a means of symmetrical design, which corresponds essentially to the double mirror-inverted embodiment of the variant according to FIGS. 1 through 3 in order to release a double-width second path passage D for the crossing of a third one. In particular, a hinged piece 3 each of identical design is articulated to both the first conveying track 5 and the second conveying track 6. Both hinged pieces are driven isochronously and simultaneously.

Figure 6A:
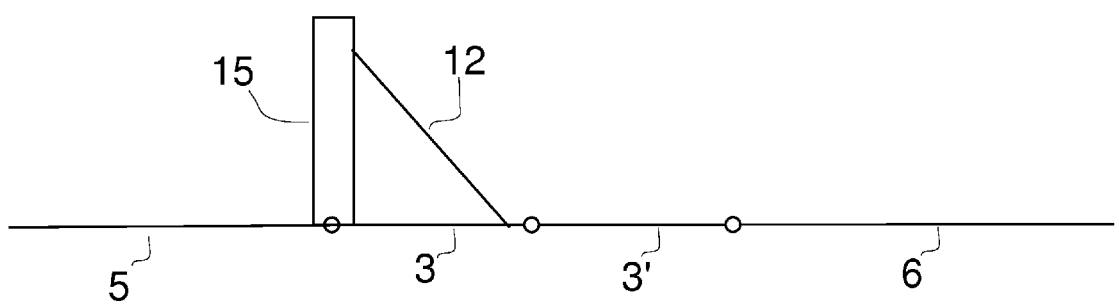
FIGS. 6A and 6B are side schematic views of another embodiment.
Figure 6B:
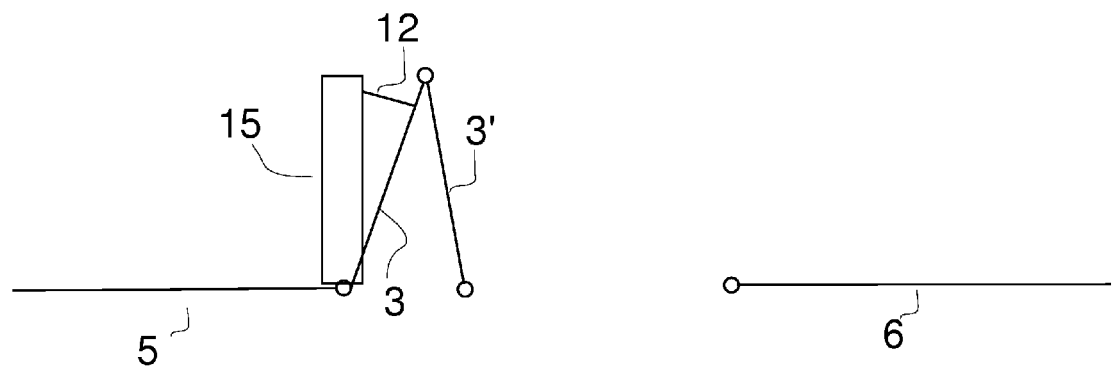

In another embodiment variant, as shown in FIGS. 6A and 6B, provisions may be made in a Conveying device 1 for another hinged piece 3' of the same type to be articulated to the free longitudinal end of the articulated hinged piece 3 according to FIGS. 1 through 3. Both hinged pieces 3 are now articulated to the first conveying track 5 and are also operated by the same drives according to FIGS. 1 through 3 in the pylons 15 of the first (left-hand) conveying track 5. The free longitudinal end of the second hinged piece, which is the right-hand end now, will always remain on the floor 4 and is supported there by rollers.

Figure 5:
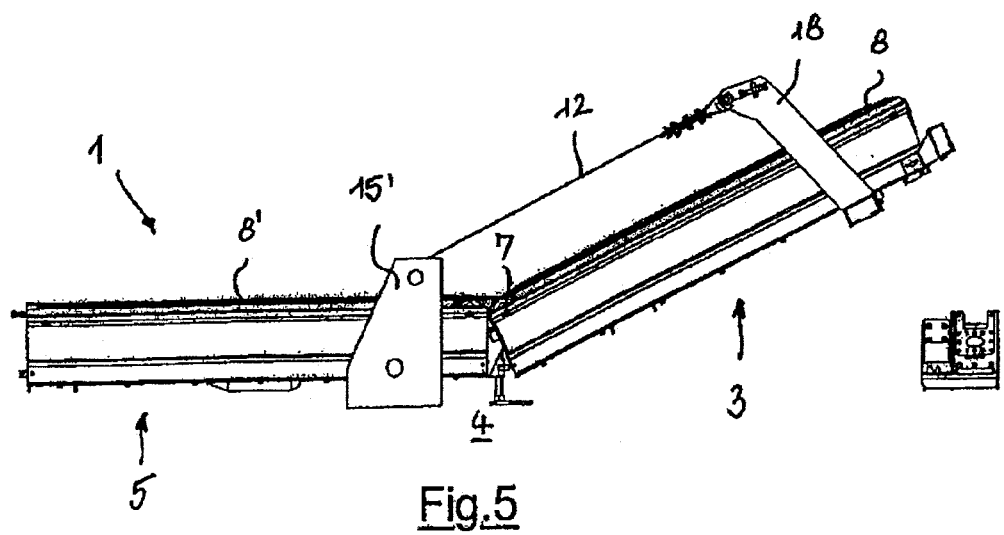
FIG. 5 is a side view showing another embodiment of pallet conveying tracks.

According to FIG. 5, a Conveying device 1, which has basically the same design as the embodiment variant according to FIGS. 1 through 3, is equipped with pylons 15' of a short height, which project only slightly above the height of the line of the lateral rotary drive 8, 8'. The flexible pulling means 12 now extend essentially in parallel to the hinged piece 3. The anchoring points 18 on the cross rail, which fasten the free (right-hand) ends of the pulling means 12, are in a correspondingly high position. The electric drives arranged in the pylons 15' are equipped with step-up gearing.

As can be seen, the conveying track installed on the floor 4 of a room or in open air is consequently divided into a first conveying track 5 and a second conveying track 6 and has a hinged piece 6 arranged in between in the manner of the conveying track, the conveying track being a double-belt conveyor with two lateral rotary drives 8', which extend in the longitudinal direction of the conveying track and on which the pallets are supported on the top side, the hinged piece 3 having an identical design is designed as a drawbridge with two lateral, flexible pulling means 12 that can be wound up and to which the first or second conveying track 5, 6 with horizontal, transversely extending pivot axis 7 is articulated and can be pivoted upward from a floor position into a high position by winding up the pulling means and locked by locking means. The free ends of the pulling means 12 are fastened to the non-articulated end of the hinged piece 3, and the ends of the pulling means that can be wound up by drives are fastened or deflected on the top side at or in two lateral pylons 15, 15', which are supported on the floor side and project upward relative to the conveying track.

While specific embodiments of the invention have been shown and described in detail to illustrate the application of the principles of the invention, it will be understood that the invention may be embodied otherwise without departing from such principles.

The invention claimed is:

1. A conveying arrangement comprising:
   a floor surface including a first path and a second path, said first path and said second path intersecting at an intersection;
   a first conveying track arranged on said floor surface along said first path, said first conveying track being a double belt conveyor with two lateral rotary drive belts extending in a longitudinal direction of said first conveying track, said two lateral rotary drive belts have a topside which supports the goods;
   a second conveying track arranged on said floor surface along said first path, said second conveying track being a double belt conveyor with two lateral rotary drive belts extending in a longitudinal direction of said second conveying track, said two lateral rotary drive belts have a topside which supports the goods;
   a hinged piece arranged in between said first conveying track and said second conveying track at said intersection, said hinged piece being a double belt conveyor with two lateral rotary drive belts which extend in a longitudinal direction of said hinged piece, said hinged piece having an articulated end being pivotally connected to an end of said first conveying track about a pivot axis and pivotal between a floor position and a high position, said floor position of said hinged piece connecting said first and second conveying tracks to complete said first path, said high position moving a free end of said hinge piece above said floor position and clearing said intersection for travel along said second path;
   first and second drawbridge drives each including a flexible pulling element connected to said hinged piece, said first and second draw bridge drives being arranged and connected to said hinged piece to move said hinged piece between said floor position and said high position by winding up said flexible pulling elements.

2. An arrangement in accordance with claim 1, further comprising:
   an additional hinged piece with an articulated end pivotally connected to a free end of said hinged piece, said additional hinged piece being a double belt conveyor with two lateral rotary drive belts which extend in a longitudinal direction of said additional hinged piece.

3. An arrangement in accordance with claim 2, wherein:
   said hinged piece and said additional hinged piece are moved into a substantially vertical position when said first and second drawbridge drives move said hinged piece into said high position to clear said intersection for travel along said second path.

4. An arrangement in accordance with claim 2, wherein:
   said additional hinged piece has a free end which remains on said floor surface when said hinged piece is in said floor position and in said high position.

\* \* \* \* \*